United States Patent
Murayama

(10) Patent No.: US 9,574,456 B2
(45) Date of Patent: Feb. 21, 2017

(54) TURBOCHARGER

(71) Applicant: IHI Corporation, Koto-ku (JP)

(72) Inventor: Tomokazu Murayama, Tokyo (JP)

(73) Assignee: IHI Corporation, Koto-ku (JP)

( * ) Notice: Subject to any disclaimer, the term of this patent is extended or adjusted under 35 U.S.C. 154(b) by 330 days.

(21) Appl. No.: 14/524,669

(22) Filed: Oct. 27, 2014

(65) Prior Publication Data

US 2015/0044033 A1 Feb. 12, 2015

Related U.S. Application Data

(63) Continuation of application No. PCT/JP2013/066562, filed on Jun. 17, 2013.

(30) Foreign Application Priority Data

Jun. 26, 2012 (JP) ................................. 2012-142661

(51) Int. Cl.
    *F01D 17/10* (2006.01)
    *F01D 25/04* (2006.01)
    *F02B 37/18* (2006.01)

(52) U.S. Cl.
    CPC ............. *F01D 17/105* (2013.01); *F01D 25/04* (2013.01); *F02B 37/183* (2013.01);
    (Continued)

(58) Field of Classification Search
    CPC ...... F01D 17/105; F01D 25/04; F02B 37/183; F02B 37/186; F05D 2220/40; Y02T 10/144

See application file for complete search history.

(56) References Cited

U.S. PATENT DOCUMENTS 4,098,085 A * 7/1978 McDowell .............. F02B 37/18
    137/527
4,463,564 A * 8/1984 McInerney ........... F01D 17/105
    137/892

(Continued)

FOREIGN PATENT DOCUMENTS

CN      101952568 A    1/2011
CN      102472160 A    5/2012

(Continued)

OTHER PUBLICATIONS

Combined Chinese Office Action and Search Report issued on May 5, 2016 in Patent Application No. 201380027024.X (with English language translation of categories of cited documents).
International Search Report issued Aug. 13, 2013 for PCT/JP2013/066562 filed Jun. 17, 2013 with English Translation.
International Written Opinion issued Aug. 13, 2013 for PCT/JP2013/066562 filed Jun. 17, 2013.

*Primary Examiner* — Igor Kershteyn
(74) *Attorney, Agent, or Firm* — Oblon McClelland, Maier & Neustadt, L.L.P.

(57) ABSTRACT

A turbocharger includes an open-and-close mechanism which opens and closes a circulation hole through which an exhaust gas flows into a turbine housing or the exhaust gas flows out of the turbine housing. The open-and-close mechanism includes: a valve; and an attachment plate one end of which is fixed to the valve, and the other end of which is provided with an insertion hole through which a stem turnably supported by the turbine housing is inserted, and an exposure hole which communicates with the insertion hole to expose part of an outer peripheral surface of the stem. The diameter of the insertion hole is gradually smaller in a direction of insertion of the stem. The stem includes a tapered portion whose diameter is gradually smaller toward its tip end in the direction of insertion into the insertion hole.

3 Claims, 3 Drawing Sheets

(52) U.S. Cl.
CPC ........ F02B 37/186 (2013.01); F05D 2220/40 (2013.01); Y02T 10/144 (2013.01)

(56) References Cited

U.S. PATENT DOCUMENTS

| | | | | |
|---|---|---|---|---|
| 4,592,330 | A | * | 6/1986 | Mayer ..................... F04F 13/00 123/559.2 |
| 4,730,456 | A | * | 3/1988 | Tadokoro ............... F01D 17/18 251/298 |
| 4,794,758 | A | * | 1/1989 | Nakazawa .............. F01D 17/18 60/602 |
| 5,046,317 | A | * | 9/1991 | Satokawa ............. F01D 17/105 415/151 |
| 5,584,181 | A | | 12/1996 | Jinnouchi |
| 5,996,348 | A | * | 12/1999 | Watkins ................ F02B 37/183 60/602 |
| 8,459,022 | B2 | * | 6/2013 | Cizek ................... F01D 17/105 251/210 |
| 9,010,109 | B2 | * | 4/2015 | Marques ............... F01D 17/105 251/298 |
| 2011/0000209 | A1 | * | 1/2011 | Boening ................ F01D 17/20 60/602 |
| 2013/0089411 | A1 | | 4/2013 | Ward |

FOREIGN PATENT DOCUMENTS

| | | |
|---|---|---|
| DE | 3916221 | 11/1990 |
| JP | 57-168733 | 10/1982 |
| JP | 62-20132 | 2/1987 |
| JP | 62-093514 | 4/1987 |
| JP | 04-272430 | 9/1992 |
| JP | 05-248253 | 9/1993 |
| JP | 08-232671 | 9/1996 |
| JP | 08-334030 | 12/1996 |
| JP | 11-044219 | 2/1999 |
| JP | 2004-332686 | 11/2004 |
| WO | WO 2011/149867 A2 | 12/2011 |

* cited by examiner

TURBOCHARGER

CROSS REFERENCE TO RELATED APPLICATIONS

This application is a continuation application of International Application No. PCT/JP2013/066562, filed on Jun. 17, 2013, which claims priority to Japanese Patent Application No. 2012-142661, filed on Jun. 26, 2012, the entire contents of which are incorporated by references herein.

BACKGROUND OF THE INVENTION

1. Field of the Invention

The present invention relates to a turbocharger including a valve configured to open and close a circulation hole for an exhaust gas to or from a turbine housing.

2. Description of the Related Art

Turbochargers have been conventionally known in which a turbine shaft is rotatably supported by a bearing housing with a turbine impeller provided to one end of the turbine shaft, and with a compressor impeller provided to the other end of the turbine shaft. This turbocharger is connected to an engine. The turbine impeller is rotated by an exhaust gas discharged from the engine. The rotation of the turbine impeller is transmitted to the compressor impeller via the turbine shaft, and the compressor impeller is thus rotated. Thereby, the turbocharger compresses air with the rotation of the compressor impeller, and supercharges the engine with the compressed air.

A turbocharger described in Japanese Patent Application Laid-Open Publication No. H11-044219 (Patent Document 1) includes a wastegate valve. The wastegate valve allows part of an exhaust gas guided into a turbine housing to reach a downstream side of the turbine impeller by bypassing a turbine scroll passage which communicates with the turbine impeller. The wastegate valve is formed from: a stem pivotally supported by a bearing placed in the turbine housing; an attachment plate having an insertion hole into which the stem is to be inserted; and a valve body attached to the attachment plate.

Along with a turn of the stem, the wastegate valve is closed with a contact surface of a valve body coming into contact with a seat surface which is provided with the circulation hole of the bypass passage in the turbine housing. For this reason, if the contact surface of the valve body comes into contact with the seat surface in an inclined manner due to dimensional errors and the like, the valve cannot be closed completely. With this taken into consideration, the wastegate valve is designed to absorb the influence of the errors by providing a clearance between the valve and the attachment plate to provide the valve with a movable range in an inclination angle with respect to the attachment plate. To put it concretely, a projecting portion jutting out from an opposite side of the valve body from the contact surface is inserted through a through-hole provided in the attachment plate, and a part of the projecting portion which sticks out from the insertion hole is fixed by a nut with a clearance left between the valve body and the attachment plate. In this case, the inclination is made variable so that the contact surface of the valve body is located parallel to the seat surface even if the contact surface of the valve body comes into contact with the seat surface in an inclined manner.

SUMMARY OF THE INVENTION

While opened, the wastegate valve described in aforementioned Patent Document 1 causes vibrations and noises because the valve body, the attachment plate and the nut repeatedly come into and out of contact with one another due to exhaust pulsation of the engine.

In this manner, the valve configured to open and close the circulation hole for the exhaust gas to and from the turbine housing causes the vibrations and noises if the clearance is provided between the valve body and the attachment plate to provide the valve with the movable range in the inclination angle with respect to the attachment plate. Against this background, there has been a demand for a development of a structure which is capable of eliminating vibrations and noises while securely closing the hole in the seat surface when the valve is closed.

An object of the present invention is to provide a turbocharger which is capable of eliminating vibrations and noises when the valve is opened, and securely closing the circulation hole for the exhaust gas to and from the turbine housing when the valve is closed.

An aspect of the present invention is a turbocharger, which includes: a turbine housing configured to house a turbine impeller; an open-and-close mechanism configured to open and close a circulation hole through which an exhaust gas flows into or out of the turbine housing. Here, the open-and-close mechanism includes: a valve configured to move to a closing position where the valve closes the circulation hole by coming into contact with a seat surface in which the circulation hole is opened, or to an opening position where the valve opens the circulation hole by moving away from the seat surface; and an attachment plate one end of which is fixed to the valve, and the other end of which is provided with an insertion hole through which a stem turnably supported by the turbine housing is inserted, and an exposure hole which communicates with the insertion hole to expose part of an outer peripheral surface of the stem. Moreover, the insertion hole has a diameter being gradually smaller in a direction of insertion of the stem, and the stem includes a tapered portion having a diameter being gradually smaller toward its tip end in the direction of insertion into the insertion hole.

When the valve is in the closing position, a turn axis of the stem supported by the turbine housing may be located closer to the exposure hole than the center of the insertion hole is.

The turn axis of the stem may be located farther from the seat surface than the center of the insertion hole is.

The present invention makes it possible to eliminate vibrations and noises when the valve is opened, and to securely close the circulation hole for the exhaust gas to and from the turbine housing when the valve is closed.

BRIEF DESCRIPTION OF THE DRAWINGS

FIGS. 4A to 4C are partial magnified views of a stem and its vicinity taken along a cross section indicated with the IV-IV line of FIG. 3, in which FIG. 4A shows a case where there is no dimensional error (or a dimensional error is small), and FIGS. 4B and 4C show cases where there is a dimensional error (or a dimensional error is large).

DESCRIPTION OF THE PREFERRED EMBODIMENTS

Referring to the accompanying drawings, detailed descriptions will be hereinbelow provided for an embodiment of the present invention. Dimensions, materials, concrete numerical values and the like in the embodiment are shown as examples just for the purpose of facilitating the understanding of the present invention, and do not limit the present invention unless otherwise indicated. In the specification and the drawings, components having virtually the same functions and configurations are denoted by the same reference signs and duplicated explanations are omitted, and components not directly related to the present invention are omitted from the drawings.

Figure 1:
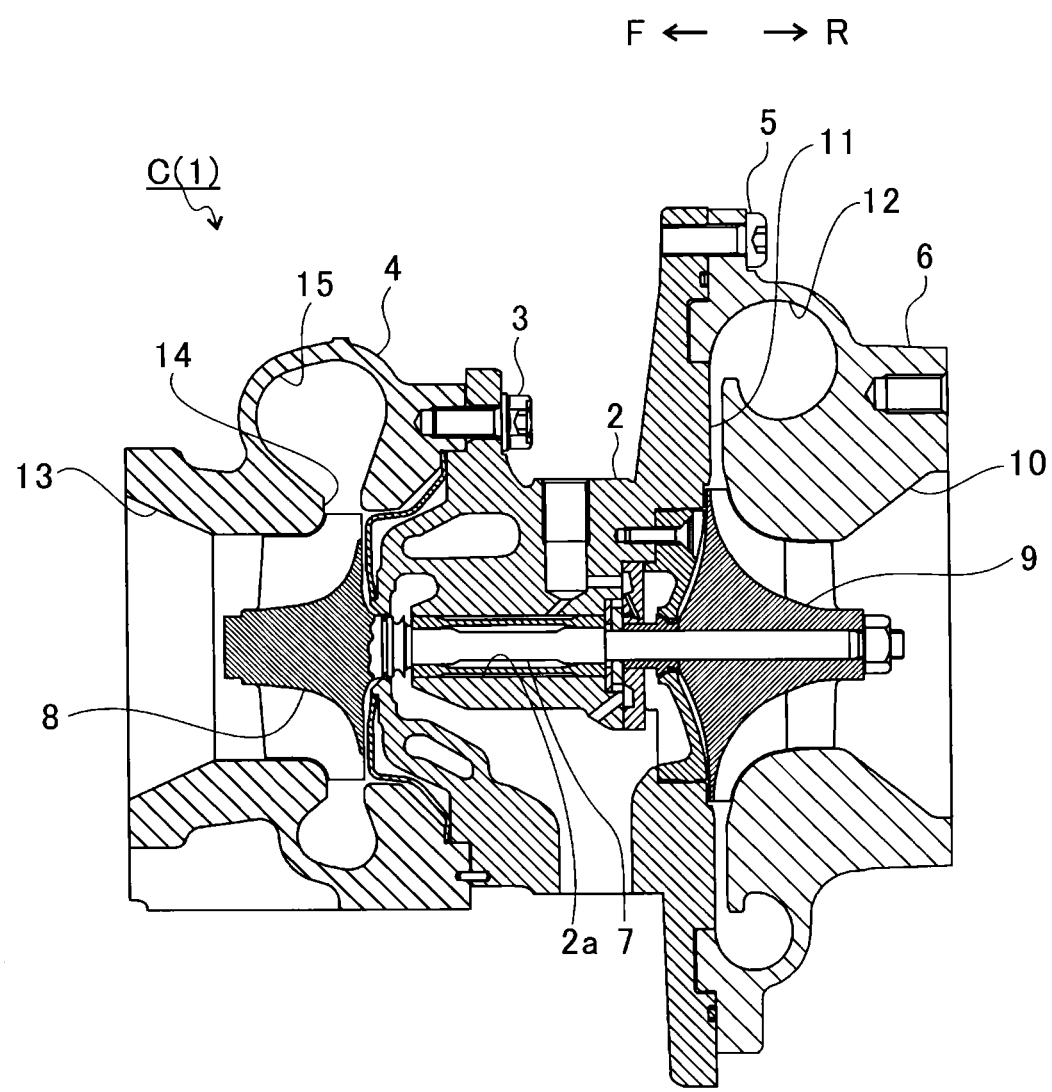
FIG. 1 is a schematic cross-sectional view of a turbocharger of an embodiment of the present invention.

FIG. 1 is a schematic cross-sectional view of a turbocharger C. The following descriptions will be given with an arrow F direction in FIG. 1 pointing to the front of the turbocharger C, and with an arrow R direction in FIG. 1 pointing to the rear of the turbocharger C. As shown in FIG. 1, the turbocharger C includes a turbocharger body 1. The turbocharger body 1 includes: a bearing housing 2; a turbine housing 4 connected to the front of the bearing housing 2 by use of a fastener bolt 3; and a compressor housing 6 connected to the rear of the bearing housing 2 by use of a fastener bolt 5. These housings are integrated into the turbocharger body 1.

A bearing bore 2a is formed in the bearing housing 2. The bearing bore 2a penetrates through the bearing housing 2 in the front-rear direction of the turbocharger C. A turbine shaft 7 is rotatably supported by the bearing bore 2a. A turbine impeller 8 is integrally fixed to the front end portion (one end) of the turbine shaft 7. The turbine impeller 8 is rotatably housed in the turbine housing 4. In addition, a compressor impeller 9 is integrally fixed to the rear end portion (the other end) of the turbine shaft 7. The compressor impeller 9 is rotatably housed in the compressor housing 6.

An inlet port 10 is formed in the compressor housing 6. The inlet port 10 is opened toward the rear of the turbocharger C, and is connected to an air cleaner, albeit not illustrated. Furthermore, when the bearing housing 2 and the compressor housing 6 are connected together by use of the fastener bolt 5, the opposing surfaces of the two housings 2, 6 form a diffuser passage 11 configured to compress and boost air. The diffuser passage 11 is shaped like a ring, extending from its inner to outer sides in radial directions of the turbine shaft 7 (the compressor impeller 9). The inner side of the diffuser passage 11 in the radial directions communicates with the inlet port 10 via the compressor impeller 9.

In addition, the compressor housing 6 is provided with a compressor scroll passage 12. The compressor scroll passage 12 is shaped like a ring, and is situated outward of the diffuser passage 11 in the radial directions of the turbine shaft 7 (the compressor impeller 9). The compressor scroll passage 12 communicates with an intake port of an engine, albeit not illustrated, and communicates with the diffuser passage 11 as well. For this reason, once the compressor impeller 9 rotates, a fluid is taken into the compressor housing 6 from the inlet port 10; the pressure of the fluid taken thereinto is boosted by the diffuser passage 11 and the compressor scroll passage 12; and the resultant fluid is guided to the intake port of the engine.

A discharge port 13 is formed in the turbine housing 4. The discharge port 13 is opened toward the front of the turbocharger C, and is connected to an exhaust emission control system, albeit not illustrated. Furthermore, the turbine housing 4 is provided with a passage 14 and a turbine scroll passage 15. The turbine scroll passage 15 is shaped like a ring, and is situated outside the passage 14 in the radial directions of the turbine shaft 7 (the turbine impeller 8). The turbine scroll passage 15 communicates with a gas inlet port to which an exhaust gas emitted from an exhaust manifold of the engine, albeit not illustrated, is guided. The turbine scroll passage 15 communicates with the passage 14 as well. The exhaust gas is guided from the gas inlet port to the turbine scroll passage 15, and is further guided to the discharge port 13 via the passage 14 and the turbine impeller 8. For this reason, during its flowing process, the exhaust gas rotates the turbine impeller 8. Thereafter, the torque of the turbine impeller 8 is transmitted to the compressor impeller 9 via the turbine shaft 7. The torque of the compressor impeller 9 boosts the pressure of the fluid as described above, and the resultant fluid is guided to the intake port of the engine.

Figure 2:
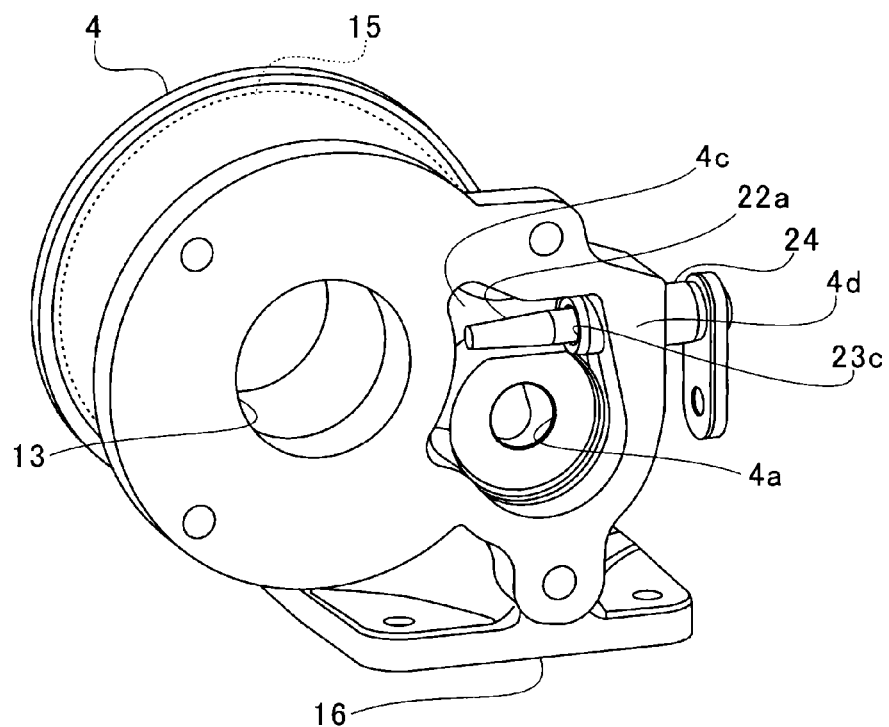
FIG. 2 is a perspective view of an external appearance of a turbine housing of the embodiment of the present invention.

FIG. 2 is a perspective view of an external appearance of the turbine housing 4. As shown in FIG. 2, the turbine housing 4 is provided with a circulation hole 4a. The circulation hole 4a is opened in a wall which forms a passage connecting a gas inflow port 16 and the turbine scroll passage 15 (indicated with a broken line in FIG. 2). The circulation hole 4a is opened in the same direction as is the discharge port 13. After the fluid (the exhaust gas) flows in from the gas inflow port 16, part of the fluid can flow out to the downstream of the turbine impeller 8 via the circulation hole 4a, i.e., by bypassing the turbine impeller 8.

The open-and-close mechanism controls the flow rate of the exhaust gas bypassing the turbine impeller 8 by opening and closing the circulation hole 4a in accordance with the operation of an actuator, albeit not illustrated.

Figure 3:
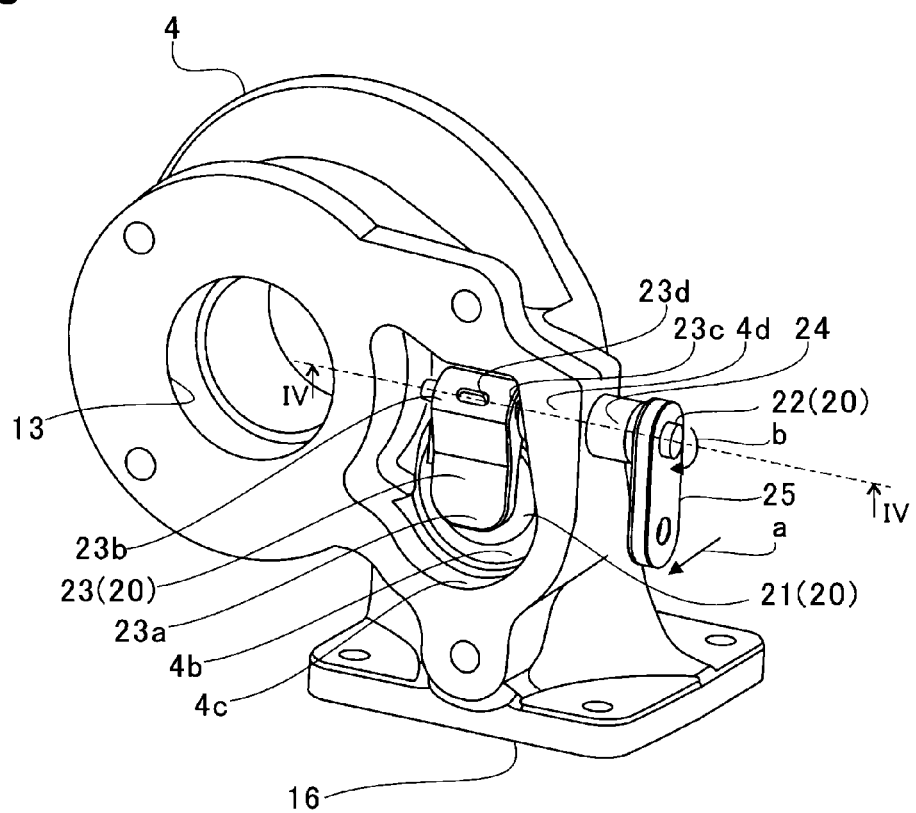
FIG. 3 is an explanatory view for explaining an open-and-close mechanism of the embodiment of the present invention.

FIG. 3 is an explanatory diagram for explaining the open-and-close mechanism 20. As shown in FIG. 3, the open-and-close mechanism 20 includes a valve 21, a stem 22 and an attachment plate 23.

The valve 21 is a valve body whose outer diameter is larger than the diameter of an opening portion of the circulation hole 4a. The turbine housing 4 has a seat surface 4b in which the circulation hole 4a (see FIG. 2) is opened. The seat surface 4b is provided in the bottom surface of a depression 4c which is lower than a discharge port 13-side end surface of the turbine housing 4. The valve 21 is housed in the depression 4c.

The turbine housing 4 has an end surface in which the depression 4c and the discharge port 13 are opened (an end surface of the turbine housing 4 which is opposite from its other surface facing the bearing housing 2). This end surface includes a wall 4d which is on the opposite side of the depression 4c from the discharge port 13. The wall 4d is provided with a through-hole. The through-hole penetrates through the wall 4d in a direction orthogonal to the center lines of the discharge port 13 and the circulation hole 4a. The stem 22 is turnably supported by a bearing 24 fitted in the through-hole in the wall 4d.

A one end 23a-side portion of the attachment plate 23 is fixed to the valve 21. In addition, an opposite end 23b-side portion of the attachment plate 23 is provided with an insertion hole 23c. The insertion hole 23c penetrates through the attachment plate 23 in a direction of the extension of the through-hole in the wall 4d. The stem 22 is inserted into the insertion hole 23c.

Moreover, an exposure hole 23d is formed in the opposite end 23b-side portion of the attachment plate 23. The exposure hole 23d penetrates through the attachment plate 23 in a radial direction of the insertion hole 23c, and communicates with the insertion hole 23c. While the stem 22 is inserted into the insertion hole 23c, the exposure hole 23d exposes part of the outer peripheral surface of the stem 22. Furthermore, the part of the outer peripheral surface of the stem 22, which is exposed through the exposure hole 23d, and the attachment plate 23 are welded together.

One end-side portion of a link plate 25 is turnably connected to a rod of the actuator, albeit not illustrated. An opposite end-side portion of the link plate 25 is fixed to the stem 22. For these reasons, once the rod of the actuator operates in an arrow a direction in the drawing, the stem 22 turns in an arrow b direction with the assistance of the link plate 25. Accordingly, the attachment plate 23 and the valve 21 turn around the axial center of the stem 22.

In addition, once the rod of the actuator operates in a direction reverse to the arrow a direction, the stem 22, the attachment plate 23 and the valve 21 turn around the axial center of the stem 22 in a direction reverse to the arrow b direction as well.

Thereby, in response to the operation of the actuator, the valve 21 moves to a closing position where the valve 21 is in contact with the seat surface 4b and thus closes the circulation hole 4a, or to an opening potion where the valve 21 is away from the seat surface 4b and thus opens the circulation hole 4a.

When, however, the contact surface of the valve 21 to be in contact with the seat surface 4b comes into contact with the seat 4b in an inclined manner due to dimensional errors and the like, the circulation hole 4a cannot be closed completely even though the valve 21 is moved to the closing position. To address this, the conventional configuration provides the valve with a movable range in the inclination angle with respect to the attachment plate by providing the clearance between the valve and the attachment plate in order that the clearance can absorb the influence of the errors. While the valve is opened, however, the clearance allows the valve, the attachment plate and the like to repeatedly come into and out of contact with one another along with vibration of the turbocharger 1 due to exhaust pulses of the engine, and accordingly to cause vibrations and noises.

With this taken into consideration, the embodiment fixes the valve 21 and the attachment plate 23 together completely. To put it concretely, the valve 21 and the attachment plate 23 are integrally formed by casting, for example.

In addition, when the stem 22 and the attachment plate 23 are welded together with the contact surface of the valve 21 brought into contact (surface contact) with the seat surface 4b, their displacement due to the dimensional errors and the like is corrected. Detailed descriptions will be hereinbelow provided for the shapes of the stem 22 and the attachment plate 23, as well as a process for welding the stem 22 and the attachment plate 23.

The stem 22 of the embodiment includes a tapered portion 22a. FIG. 2 shows a state where: the stem 22 is inserted in the bearing 24 fixed to the through-hole in the wall 4d; and the valve 21 and the attachment plate 23 are removed. FIG. 2 visualizes the shape of the tapered portion 22a of the stem 22.

As shown in FIG. 2, the tapered portion 22a is a part whose diameter is gradually smaller toward its tip end in a direction of insertion into the insertion hole 23c. In addition, the cross section of the tapered portion 22a which is vertical to a turn axis of the stem 22 is shaped like a circle, and the tapered portion 22a projects into the depression 4c beyond the bearing 24.

Although the foregoing description has been provided for the case where the cross section of the tapered portion 22a which is vertical to the turn axis is shaped like a circle, the cross section of the tapered portion 22a which is vertical to the turn axis may be shaped like a circle whose circumference is partially missing, for example like a semicircle.

Figure 4A:
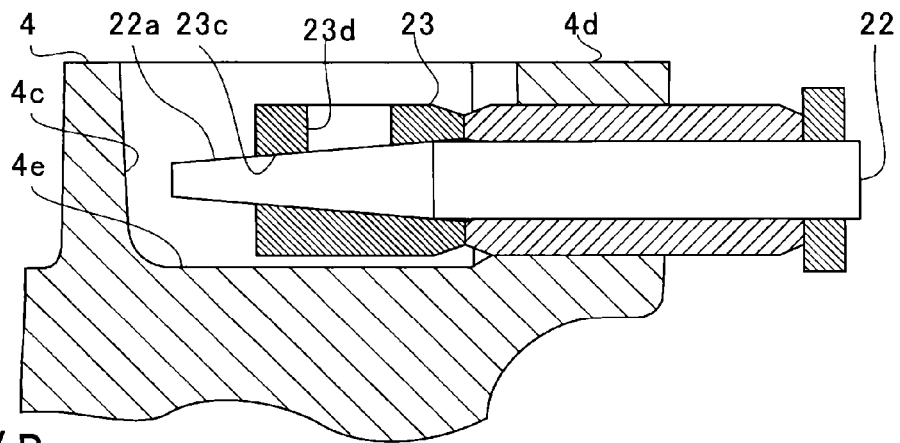
Figure 4B:
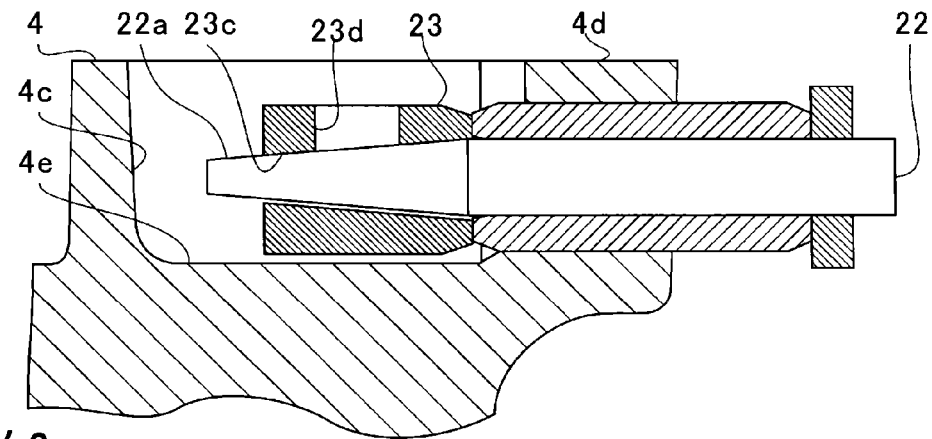
Figure 4C:
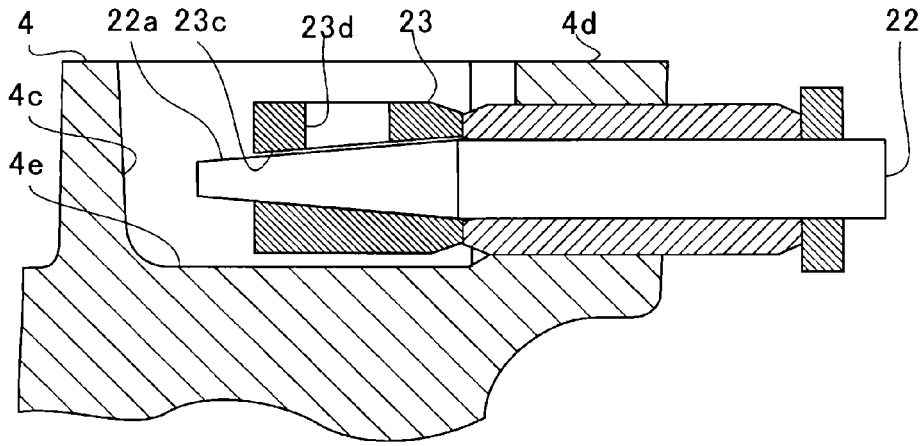

FIGS. 4A to 4C are partial magnified views of the stem 22 and its vicinity taken along a cross section indicated with the IV-IV line of FIG. 3. As shown in FIG. 4A, the insertion hole 23c in the attachment plate 23 is also tapered at the same inclination angle as the tapered portion 22a of the stem 22. In other words, the diameter of the insertion hole 23c is smaller in the direction of insertion of the stem 22 (toward the left in FIG. 4).

For this reason, when the stem 22 is inserted deeper into the insertion hole 23c with the center line of the diameter of the stem 22 (the turn axis of the stem 22) and the center line of the diameter of the insertion hole 23c (the center of the insertion hole 23c) located on the same line, the stem 22 stops at a position where the outer peripheral surface of the tapered portion 22a of the stem 22 and the inner peripheral surface of the insertion hole 23c come into surface contact with each other in their circumferential directions (see FIG. 4A).

If, however, there are dimensional errors such as sizes and processing positions in any of the valve 21, the stem 22, the seat surface 4b, the insertion hole 23c, the through-hole in the wall 4d of the turbine housing 4, and the like, even the surface contact between the contact surface of the valve 21 and the seal surface 4b does not cause the turn axis of the stem 22 and the center of the insertion hole 23c to be located on the same line.

The seat surface 4b as the contact surface with the valve 21 is formed flush with the bottom surface 4e of the depression 4c shown in FIG. 4. If the foregoing dimensional errors occur, a difference occurs the vertical distance from the bottom surface 4e (the seat surface 4b) in FIG. 4. In other words, the center of the insertion hole 23c is farther from the bottom surface 4e than the turn axis of the stem 22 does, or is located closer to the bottom surface 4e than the turn axis of the stem 22 does.

In this case, when the stem 22 is inserted deeper into the insertion hole 23c, the stem 22 stops at a position where part of the outer peripheral surface of the tapered portion 22a of the stem 22 comes into contact with part of the inner peripheral surface of the insertion hole 23c, as shown in FIGS. 4B and 4C.

To put it concretely, if the turn axis of the stem 22 is located farther away from the bottom surface 4e (the seat surface 4b) than the center of the insertion hole 23c is, the stem 22 stops, as shown in FIG. 4B, with part of the inner peripheral surface of the insertion hole 23c, which is on the upper side in FIG. 4, in contact with part of the outer peripheral surface of the tapered portion 22a of the stem 22, which is on the upper side in FIG. 4.

Meanwhile, if the turn axis of the stem 22 is located closer to the bottom surface 4e (the seat surface 4b) than the center of the insertion hole 23c is, the stem 22 stops, as shown in FIG. 4C, with part of the inner peripheral surface of the insertion hole 23c, which is on the lower side in FIG. 4, in contact with part of the outer peripheral surface of the tapered portion 22a of the stem 22, which is on the lower side in FIG. 4.

With part of the outer peripheral surface of the tapered portion 22a of the stem 22 in contact with part of the inner peripheral surface of the insertion hole 23c in either manner, the portion of the outer peripheral surface of the stem 22, which is exposed from the exposure hole 23d, and the attachment plate 23 are welded together, as described above.

As described above, in the embodiment, the stem 22 is provided with the tapered portion 22a, and the insertion hole 23c is also tapered. This makes it possible to insert the stem 22 into the insertion hole 23c with the contact surface of the valve 21 beforehand brought into surface contact with the seat surface 4b, and thereby to weld the stem 22 and the attachment plate 23 together by correcting the dimensional errors and the like. This makes the turbocharger C capable of securely closing the seat surface 4b with the valve 21, while no clearance is provided between the valve 21 and the attachment plate 23 and the valve 21 is provided with no movable range in the inclination angle with respect to the attachment plate 23. Since the valve 21 and the attachment plate 23 can be integrated into a single unit while there is no need to provide the valve 21 with the movable range in the inclination angle, neither vibrations nor noises occur due to the exhaust pulse and the like.

Furthermore, a comparison between FIGS. 4B and 4C shows that the stem 22 is closer to the exposure hole 23d in FIG. 4B than in FIG. 4C. The case shown in FIG. 4B makes the welding process easier to perform by way of the exposure hole 23d, and makes the precision in the welding better.

With the ease of the welding process and the precision in the welding taken into consideration, the turn axis of the stem 22 supported by the turbine housing 4 may be designed to be located closer to the exposure hole 23d than the center of the insertion hole 23c is, in a state where the contact surface of the valve 21 is in surface contact with the seat surface 4b. In other words, the turn axis of the stem 22 may be designed in advance to be offset to a position farther away from the bottom surface 4e (the seat surface 4b) than the center of the insertion hole 23c is.

This design makes the state shown in FIG. 4B more likely to occur than the state shown in FIG. 4C even if there are variations resulting from process errors. Accordingly, the welding process can be performed easily, and the precision in the welding can be enhanced.

The foregoing embodiment has described the open-and-close mechanism 20 configured to open and close the circulation hole 4a through which the exhaust gas flows out of the turbine housing 4. However, the circulation hole configured to be opened and closed by the open-and-close mechanism may be a hole through which the exhaust gas flows into the turbine housing 4.

To put it concretely, in a case where, for example, the turbocharger is a twin-scroll turbocharger, the open-and-close mechanism may be configured to control the flow rate of the exhaust gas which is to flow into one turbine scroll passage, and the flow rate of the exhaust gas which is to flow into the other turbine scroll passage.

Furthermore, in the case of one turbocharger constituting part of a serial multi-stage turbocharger system in which low-pressure-stage and high-pressure-stage turbochargers are connected in series to an exhaust manifold of an engine, or constituting part of a parallel multi-stage turbocharger system in which multiple turbochargers are connected in parallel to an exhaust manifold of an engine, the present invention is also applicable to an open-and-close mechanism configured to control the flow rate of the exhaust gas to flow into the turbine housing in the one turbocharger.

Although the foregoing descriptions have been provided for the preferred embodiment of the present invention with reference to the accompanying drawings, it goes without saying that the present invention is not limited to such an embodiment. It is clear that those skilled in the art could arrive at various modified examples or revised examples within the scope of claims. It should be understood that such modified and revised examples are naturally encompassed by the technical scope of the present invention as well.

What is claimed is:

1. A turbocharger comprising:
    a turbine housing configured to house a turbine impeller; and
    an open-and-close mechanism configured to open and close a circulation hole through which an exhaust gas flows into or out of the turbine housing, wherein
    the open-and-close mechanism includes
        a valve configured to move to a closing position where the valve closes the circulation hole by coming into contact with a seat surface in which the circulation hole is opened, or to an opening position where the valve opens the circulation hole by moving away from the seat surface, and
        an attachment plate one end of which is fixed to the valve, and the other end of which is provided with an insertion hole through which a stem turnably supported by the turbine housing is inserted, and an exposure hole which communicates with the insertion hole to expose part of an outer peripheral surface of the stem,
    the insertion hole has a diameter being gradually smaller in a direction of insertion of the stem, and
    the stem includes a tapered portion having a diameter being gradually smaller toward its tip end in the direction of insertion into the insertion hole.

2. The turbocharger according to claim 1, wherein when the valve is in the closing position, a turn axis of the stem supported by the turbine housing is located closer to the exposure hole than the center of the insertion hole is.

3. The turbocharger according to claim 2, wherein the turn axis of the stem is located farther from the seat surface than the center of the insertion hole is.

* * * * *